United States Patent [19]
Macken et al.

[11] Patent Number: 5,986,856
[45] Date of Patent: Nov. 16, 1999

[54] MAGNETORESISTIVE SENSOR WITH IMPROVED STABILITY

[75] Inventors: Declan Macken, Derry; Alan B. Johnston, Glasgow, both of United Kingdom

[73] Assignee: Segate Technology, Inc., Scotts Valley, Calif.

[21] Appl. No.: 08/945,190

[22] PCT Filed: Sep. 4, 1997

[86] PCT No.: PCT/US97/15537

§ 371 Date: Oct. 23, 1997

§ 102(e) Date: Oct. 23, 1997

[87] PCT Pub. No.: WO98/52190

PCT Pub. Date: Nov. 19, 1998

Related U.S. Application Data

[60] Provisional application No. 60/046,316, May 13, 1997.

[51] Int. Cl.[6] .................................................. G11B 5/127
[52] U.S. Cl. ............................................................ 360/113
[58] Field of Search ..................................... 360/113, 122, 360/125, 126

[56] References Cited

U.S. PATENT DOCUMENTS

| | | | |
|---|---|---|---|
| 4,881,443 | 11/1989 | Bhattacharyya et al. | 360/113 |
| 5,168,409 | 12/1992 | Koyama et al. | 360/113 |
| 5,255,141 | 10/1993 | Valstyn et al. | 360/126 |
| 5,264,980 | 11/1993 | Mowry et al. | 360/113 |
| 5,495,378 | 2/1996 | Bonyhard et al. | 360/113 |
| 5,535,079 | 7/1996 | Fukazawa et al. | 360/126 |
| 5,621,595 | 4/1997 | Cohen | 360/126 |
| 5,633,771 | 5/1997 | Yoda et al. | 360/113 |

*Primary Examiner*—Allen T. Cao
*Attorney, Agent, or Firm*—Westman, Champlin & Kelly, P.A.

[57] ABSTRACT

A transducer in a magnetic storage device includes an elongated magnetoresistive element having an active region. First and second electrical contacts couple to the elongated magnetoresistive element on opposite sides of the active region. A bottom inductive write pole and shared shield is positioned adjacent the elongated magnetoresistive element and includes a body region and a pole tip region proximate the active region. The shared shield includes a notch defined between the pole tip region and the body region to thereby improve magnetic stability in the pole tip region. A top inductive write pole is spaced apart from the bottom inductive write pole and shared shield to form a magnetic gap with the pole tip region for inductively writing information.

9 Claims, 5 Drawing Sheets

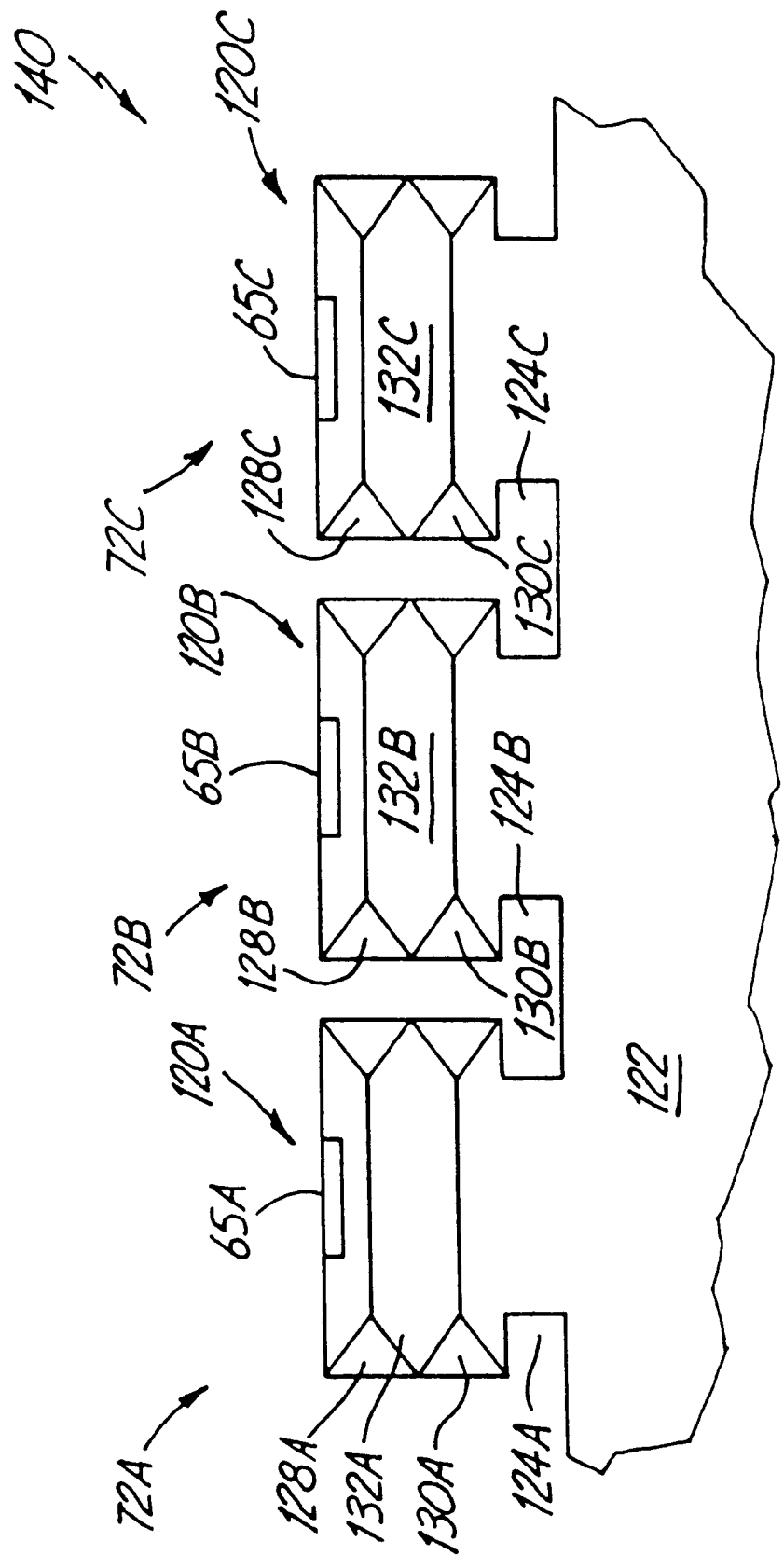

MAGNETORESISTIVE SENSOR WITH IMPROVED STABILITY

This application is based on Provisional Application Ser. No. 60/046,316 filed on May 13, 1997.

BACKGROUND OF THE INVENTION

The present invention relates to magnetoresistive (MR) sensors. More specifically, the present invention relates to a magnetoresistive sensor having improved stability during operation.

Magnetic storage systems are used to store information in a magnetic format for subsequent retrieval. Various technologies are available for reading back the stored information. One promising technology is the use of a magnetoresistive sensor for such read back.

Magnetoresistive sensors are responsive with a change in resistivity caused by the presence of magnetic fields and are increasingly being employed as read back elements in the heads of magnetic disc drives. They are particularly advantageous because the change in resistivity is independent of disc speed and depends only on the magnetic flux. Further, the sensor output is easily scaled by adjusting the sense current.

Magnetoresistive sensors typically comprise a thin strip of ferromagnetic material such as NiFe magnetized along an easy axis of low coercivity. The strip is mounted in the head such that the easy axis is transverse to the direction of disc rotation and parallel to the plane of the disc. Magnetic flux from the disc surface causes rotation of the magnetization vector of the strip, which in turn causes a change in electrical resistivity. A sense current is passed through the thin strip and the magnetic flux can be detected by measuring the change in voltage across the element as a result of the changing resistivity.

One problem encountered with magnetoresistive sensors is Barkhausen noise which is caused by an irreversible motion of magnetic domains in the presence of an applied field, i.e., coherent rotation of the magnetization vector is non uniform and suppressed, and depends upon domain wall behavior. Barkhausen noise generated in the magnetoresistive element may be eliminated by creating a single magnetic domain in the sense current region of the magnetoresistive strip. Reduction of such Barkhausen noise generated in the magnetoresistive element is described in U.S. Pat. No. 4,803,480 entitled DOUBLE-GAP MAGNETORESISTIVE HEAD HAVING AN ELONGATED CENTRAL WRITE/ SHIELD POLE COMPLETELY SHIELDING THE MAGNETORESISTIVE SENSOR STRIP IN THE READ GAP which was issued Feb. 7, 1989 to Mowry.

SUMMARY OF THE INVENTION

In one aspect of the present invention, a transducer in a magnetic storage device includes an elongated magnetoresistive element having an active region. First and second electrical contacts are electrically coupled to the elongated magnetoresistive element on opposite sides of the active region. Information may be read from a magnetic storage medium through the electrical contacts. A bottom inductive write pole and shared shield is positioned adjacent the magnetoresistive element and has a body region and pole tip region proximate the active region. The bottom inductive write pole and shared shield includes a notch formed therein which defines the pole tip region and the body region. The notch provides a magnetic domain structure in the shared shield which offers improved stability. A top inductive write head pole is spaced apart from the bottom inductive write pole and shared shield to form a gap therebetween for magnetically writing information.

BRIEF DESCRIPTION OF THE DRAWINGS

FIG. 6 is a top plan view of a plurality of bottom inductive write poles and shared shields in accordance with another aspect of the present invention.

DETAILED DESCRIPTION OF THE PREFERRED EMBODIMENTS

The present invention provides a magnetoresistive sensor having improved stability. In one aspect of the present invention, it is recognized that a source of Barkhausen noise is the shared shield which forms the lower pole in magnetoresistive transducers having an inductive write element.

Figure 1:
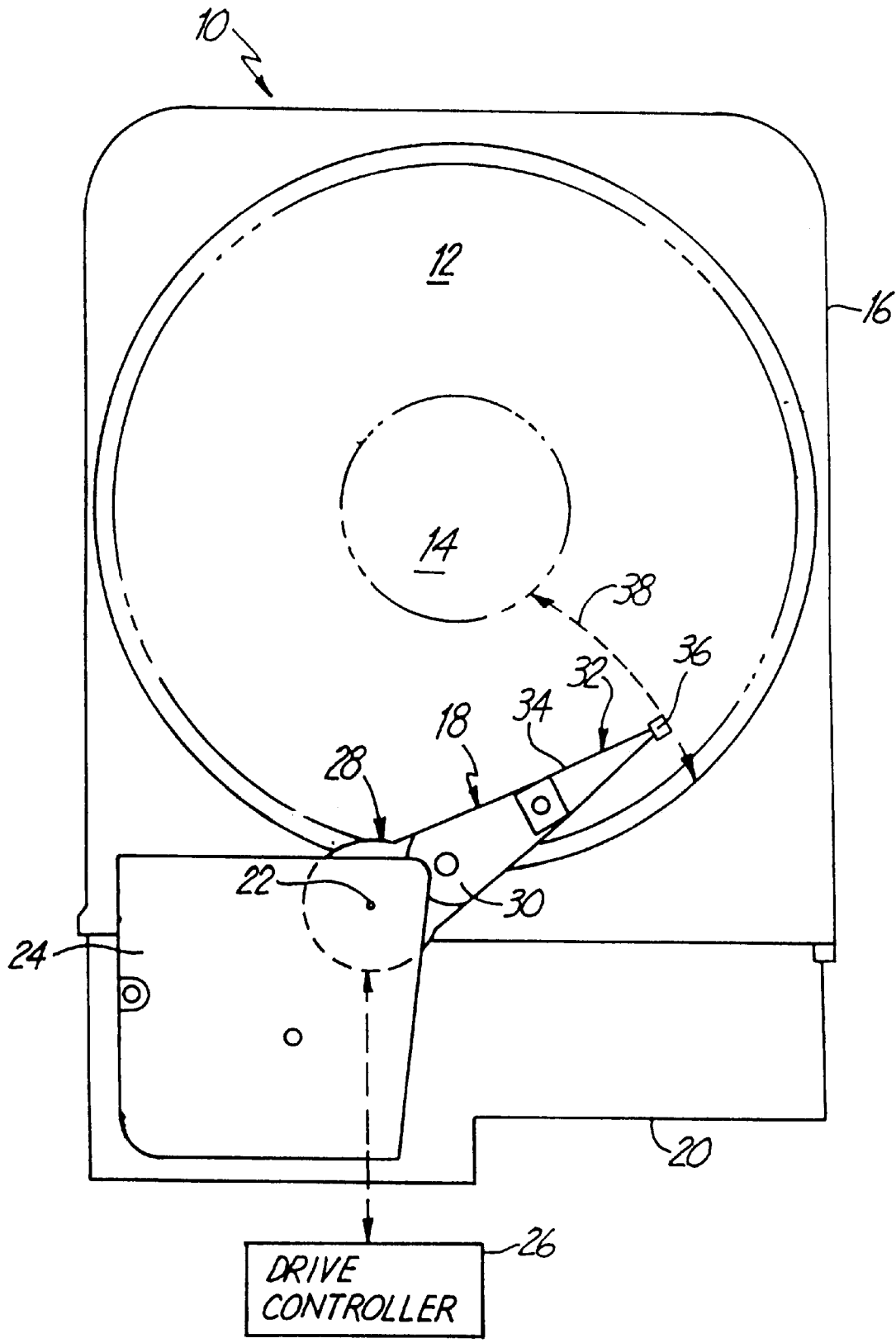
FIG. 1 is a simplified diagram of a disc drive storage system.

FIG. 1 is a top view of a disc drive 10 including a magnetoresistive sensor in accordance with the present invention. Disc drive 10 includes a magnetic disc 12 mounted for rotational movement about and axis defined by spindle 14 within housing 16. Disc drive 10 also includes an actuator 18 mounted to a base plate 20 of housing 16 and pivotally moveable relative to disc 14 about axis 22. A cover 24 covers a portion of actuator 18. Drive controller 26 is coupled to actuator 18. In the preferred embodiment, drive controller 26 is either mountable within disc drive 10, or is located outside of disc drive 10 with suitable connection to actuator 18. Actuator 18, includes an actuator arm assembly 28, a rigid support member 30, and a head gimbal assembly 32. Head gimbal assembly 32 includes a load beam or flexure arm 34 coupled to rigid member 30, and a hydrodynamic air bearing (a slider) 36 coupled by a gimbal (not shown) to load beam 34. Slider 36 supports a magnetoresistive transducer for reading information from disc 12 and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position signal to actuator 18. The position signal causes actuator 18 to pivot about axis 22. This, in turn, causes actuator 18 to pivot about axis 22. This, in turn, causes slider 36 (and consequently the transducer mounted on slider 36) to move radially over the surface of disc 12 in a generally arcuaic path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
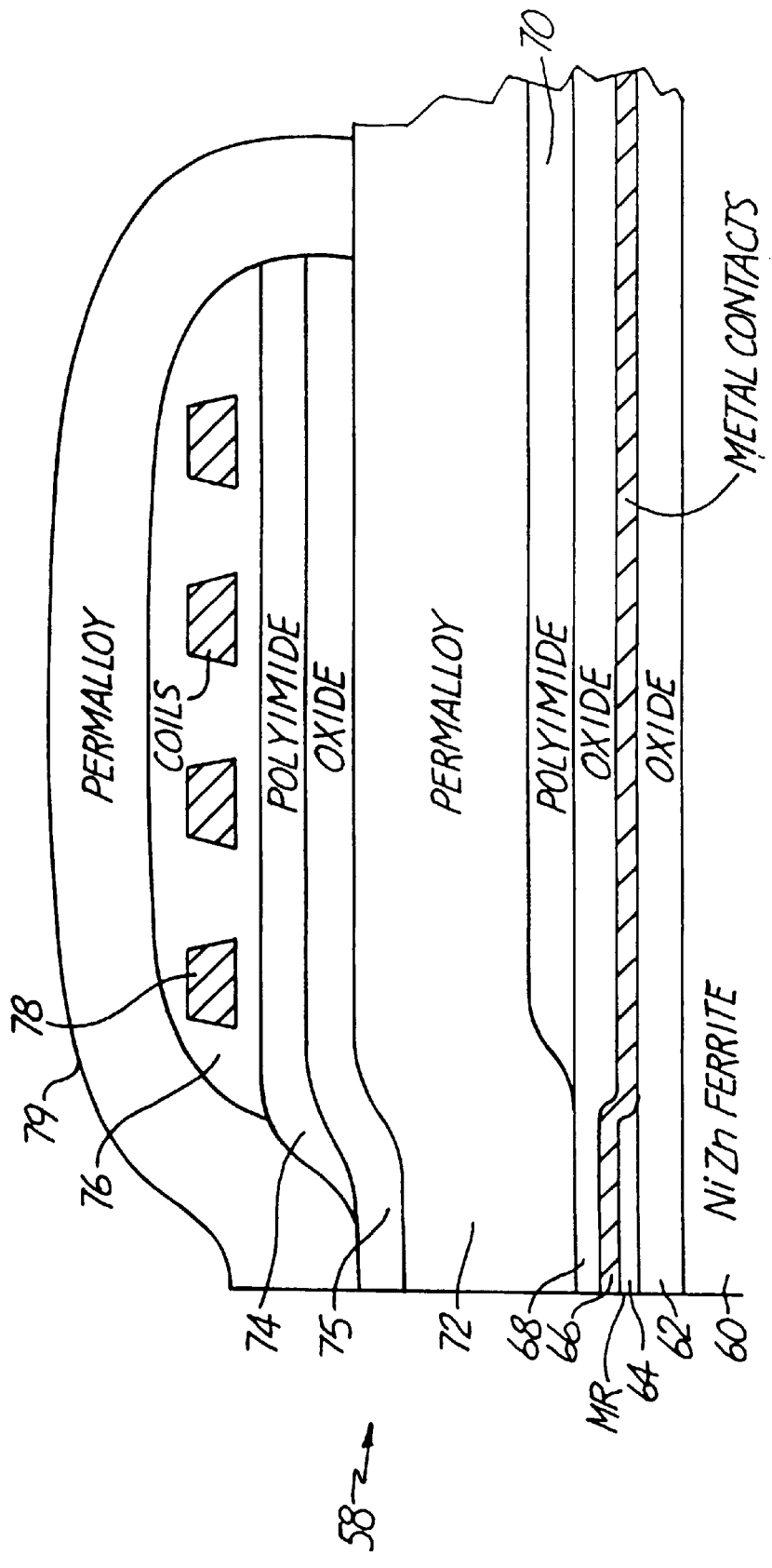
FIG. 2 is a side cross-sectional view of a magnetoresistive transducer including a bottom inductive write pole and shared shield in accordance with the present invention.

FIG. 2 is a cross-section of elements of a magnetoresistive transducer 56 which is carried on slider 36. A layer of oxide, preferably aluminum oxide 62 is deposited upon a softmagnetic substrate 60, preferably NiZn. Next, the magnetoresistive sensor material 64 is deposited in a magnetic field and patterned. (Exchange biasing material may then be deposited and patterned if desired). Metal contacts 66 are then deposited on the magnetoresistive strip 64. A second layer of oxide 68 is then deposited. These two oxide layers, 62 and 68, comprise the read gap. A layer of polyimide or photo resist 70 is then deposited and patterned as shown to remove the layer adjacent the gap end of the head. Next a layer of ferromagnetic material 70 is laid down, preferably NiFe (Permalloy). This layer 72 comprises the trailing pole/shield. Next, a write gap oxide, 75 (aluminum oxide or silicon dioxide), is deposited followed by a second layer of polyimide or photo resist 74. Metal coils 78 are deposited and patterned. Two layers of polyamide or photoresist 76 are deposited and patterned to remove the portion not adjacent the coils 78. And finally, a final layer of a ferromagnetic material is deposited to form top inductive write head pole 79 and encompass the coils and contact the other ferromagnetic layer bottom inductive write pole and shared shield 72 to form an inductive write head 58. Preferably, shield 72 is formed of permalloy.

Figure 3:
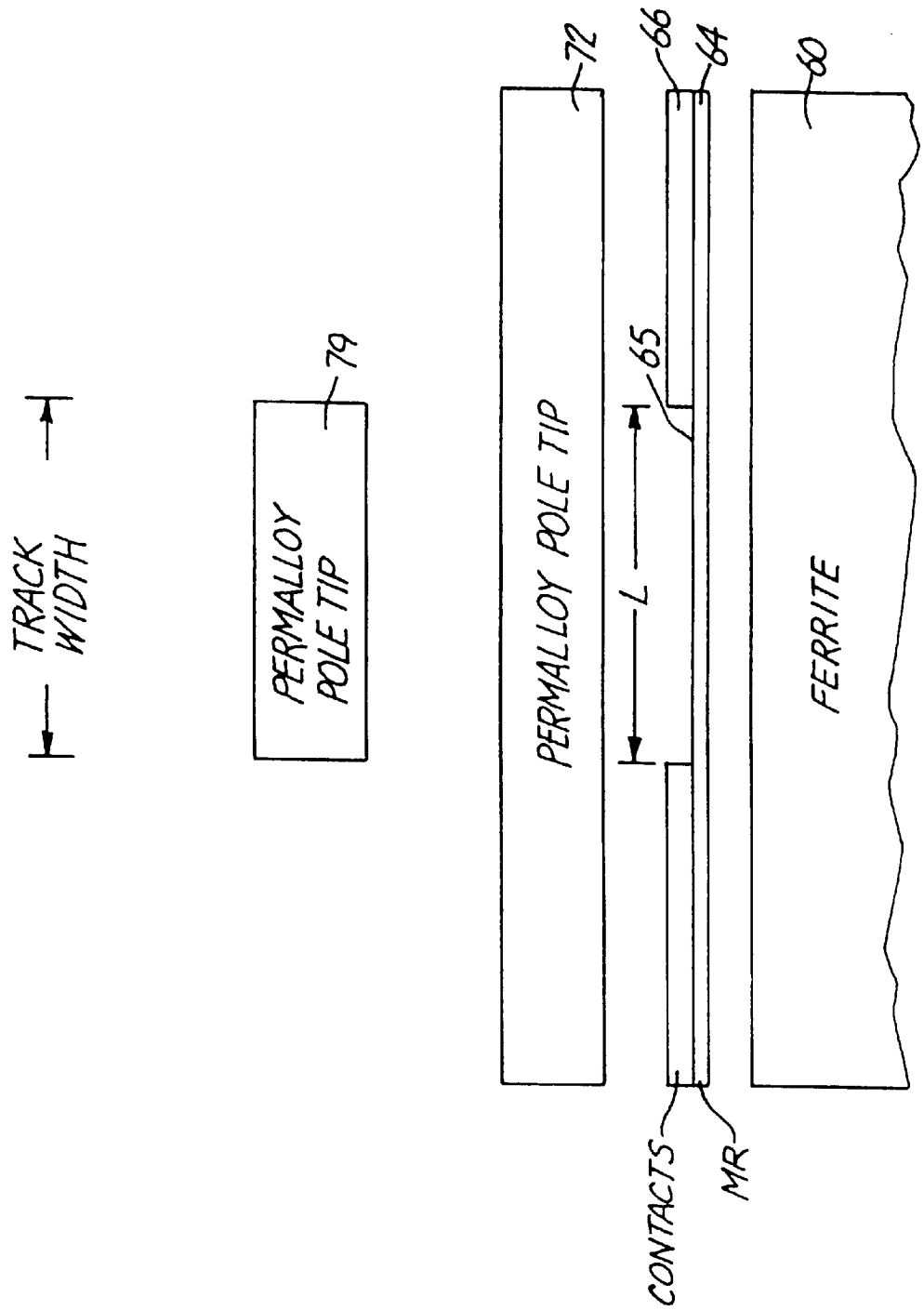
FIG. 3 is a front plan view of the magnetoresistive transducer of FIG. 2.

FIG. 3 is an end view of elements of the transducer 56 of FIG. 2. Spacing layers are omitted for clarity. Shown in the Figure are the ferrite substrate 60, the magnetoresistive strip 64, its lateral metal contacts 66 defining a central sensor active region 65 of length L, and the ferromagnetic trailing pole/shield 72, and the leading pole 79. The length of the leading pole 79 defines the written track width via magnetic mirroring with the trailing pole/shield as shown in the Figure. This length corresponds to the length L (plus a processing guard band wherein the length L is intentionally made smaller than the written track width to avoid possible cross talk) of the central region 65 of the magnetoresistive strip 64, typically, the magnetoresistive strip is longer than a track width to assist in providing a stable central region single domain. It is essential that the trailing pole/shield 72 be as long as the magnetoresistive sensor 64 to completely shield it from side fringing fields originating during the writing process. This makes the lead and trailing poles 79, 72 of different lengths. But it has been discovered that this does not affect the written track width, which is defined by the length of the leading pole 79 and the above mentioned mirroring effects.

One aspect of the present invention includes the recognition that domain walls formed in the shields of magnetoresistive (MR) sensors can interact with the MR sensor itself. These shield domain walls are mobile under the influence of the media field and stray fields and can cause the formation of moving magnetic artifacts in the sensor. This can cause instability in the MR sensor and is particularly severe where Barkhausen noise is present in the shield. The creation of a tightly designed shield domain configuration where the shield shape keeps domain walls away from the sensor region by demagnetizing forces can overcome this affect. However, MR shared poles have a requirement to function both as an upper reader shield and as a bottom writer pole. Achievement of a domain configuration in the shared pole suitable for stability and also meeting the requirements of the writer to link to the top pole at the back via requires a compromise. Kerr analysis has revealed that for a number of potential shared pole materials, a conventional notching scheme is not sufficient to give the domain state required. For conventional notching, the foremost domain wall is attracted towards the front of the notch (see FIG. 4) and can affect the sensor. This result forms an imbalance in the demagnetizing force on the domain walls at the front and back of the notch.

Figure 5:
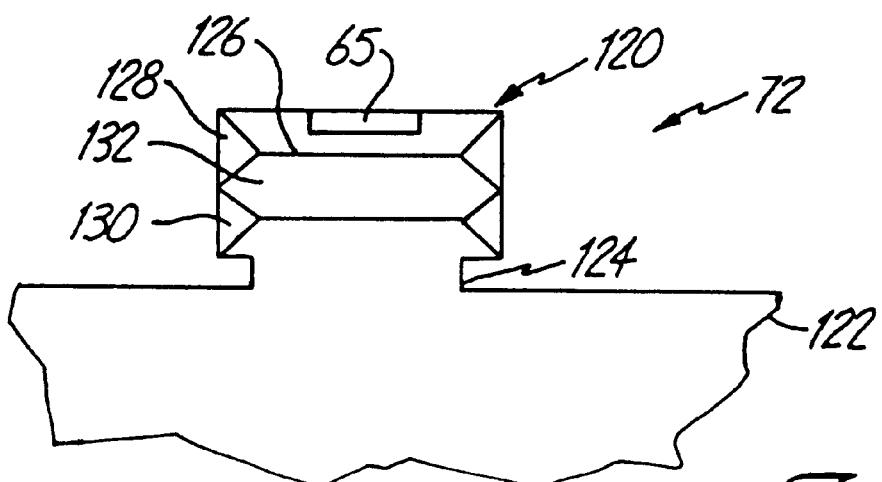
FIG. 5 is a top plan view of a bottom inductive write pole and shared shield in accordance with the present invention.

To withdraw this foremost domain wall from the sensitive sensor region, it is possible to compensate for the leading edge demagnetization forces by creating indentations at the rear of the notch protrusion giving a more equalized demagnetization force from the front to the back of the notch (see FIG. 5).

Figure 4:
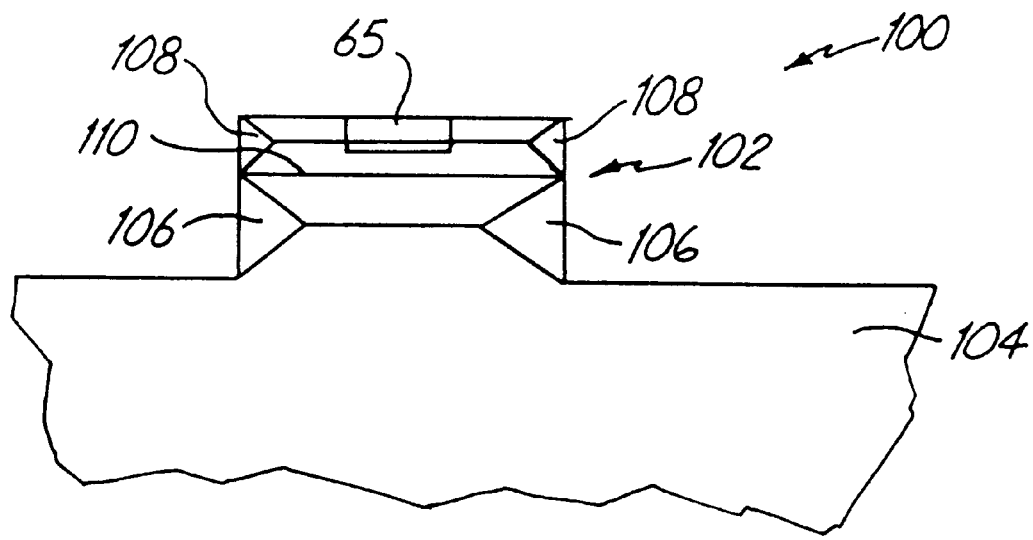
FIG. 4 is a top plan view of a prior art shared shield.

FIG. 4 shows a prior art bottom inductive write pole and shared shield 100. Shield 100 includes pole tip region 102 and body region 104. Pole tip region 102 is positioned over magnetoresistive sensor active region 65, shown in FIG. 4 projected onto pole tip region 102. Body region 104 is typically large relative to pole tip region 102 for attachment to the top pole at the back via and to support coil conductors 78. However, pole tip region 102 should be relatively small to focus the magnetic field emanating therefrom for higher density writing of magnetically encoded information. One aspect of the present invention includes the recognition that the prior art design of shield 100 the magnetic domain structure is unstable and thereby may, following a read/write operation, switch directions and introduce noise. Referring to FIG. 4, note that the closure domains 106 and 108 have differing sizes such that middle domain 110 has two sidewalls at its closure domains of differing sizes. In this prior art design, the front domain wall is attracted toward the front notch and this can effect the sensor element. This results from an imbalance in the demagnetizing force on the domain walls at the front and back of the notch.

FIG. 5 is a top plan view of shield 72 in accordance with one embodiment of the present invention. Shield 72 includes pole tip region 120 and body region 122 separated by a notch 124. Note that proper placement of the notch shifts domain wall 126 away from sensor active region 65 and causes the closure domains 128 and 130 to have substantially equal side walls whereby the middle domain region 132 has symmetrical closure domain side walls. Notch 124 provides a more equalized demagnetization force from the front to the back of the notch. This reduces the effects of noise, such as Barkhausen noise, on sensor region 65 shown in FIG. 5 projected onto pole tip region 120, thereby providing improved readback characteristics and a transducing element capable of higher density recording. Further, this still provides the body region 122 for coupling to the top pole piece and for supporting and coupling to the coil structure.

FIG. 6 is a top plan view of a multi-channel shield 140 in accordance with another aspect of the present invention. Multi-channel shield 140 includes a plurality of individual shields labelled 72A, 72B and 72C. Each shield is formed by respective pole tip regions 120A, 120B and 120C coupled to body region 122. Similar elements have retained their numbering with FIG. 6 for simplicity. The embodiment of FIG. 6 is particularly well suited for a multi-channel tape head in which multiple tape channels are accessed simultaneously. Further, the structure allows a common shared pole while ensuring individual sensor stability. During manufacture, only one of the structures needs to be probed to determined isolation from the magnetoresistive sensor. This is contrast to the necessity of probing each individual head in prior art designs. Further, the large shared pole provides improved thermal dissipation and thereby reduces heat build up in the head.

Although the present invention has been described with reference to preferred embodiments, workers skilled in the art will recognize that changes may be made in form and detail without departing from the spirit and scope of the invention. For example, in one aspect of the invention other configurations or techniques may be employed to achieve the desired domain structure.

What is claimed is:

1. A transducer in a magnetic storage device, comprising:

an elongated magnetoresistive element having an active region;

first and second electrical contacts coupled to the elongated magnetoresistive element on opposite sides of the active region for reading information;

a bottom inductive write pole and shared shield adjacent the elongated magnetoresistive element, the shared shield having a body region and a pole tip region proximate the active region, the body region and the pole tip region defined by a notch formed generally along a line between the pole tip region and the body region in the shared shield; and a top inductive write head pole spaced apart from the bottom inductive write pole and shared shield forming a magnetic gap with a pole tip region.

2. The transducer of claim 1 wherein the pole tip region includes a plurality of magnetic domains coupled by closure domains and wherein the closure domains are of substantially equal size and shape.

3. The transducer of claim 1 wherein the pole tip region includes a plurality of magnetic domains having closure domains and wherein the domain side walls are spaced apart from the active region of the elongated magnetoresistive element.

4. The transducer of claim 1 wherein the bottom inductive write pole and shared shield includes an opposed notch separating the body region and the pole tip region.

5. The transducer of claim 1 wherein the body region supports a conductive coil for writing information using the top inductive write head pole and bottom inductive write head pole and shared shield.

6. The transducer of claim 1 including a plurality of bottom inductive write pole and shared shields longitudinally spaced each having a pole tip region coupled to the body region.

7. The transducer of claim 6 wherein each of the plurality of pole tip regions is defined by a notch.

8. The transducer of claim 6 wherein the magnetic storage device comprises a magnetic tape storage device and the transducer forms a multi-channel tape head.

9. The transducer of claim 1 wherein the magnetic storage device comprises a magnetic disc drive.

* * * * *